(12) United States Patent
Renault et al.

(10) Patent No.: US 8,608,113 B2
(45) Date of Patent: Dec. 17, 2013

(54) METHOD FOR CAPTURING A CONTAINER OF PLANET-GROUND SAMPLES TRAVELING IN OPEN SPACE

(75) Inventors: Hervé Renault, Cannes-la-Bocca (FR); Francis Arbusti, La Roquette sur Siagne (FR); Hervé Sainct, Le Cannet (FR)

(73) Assignee: Thales, Neuilly-sur-Seine (FR)

( * ) Notice: Subject to any disclaimer, the term of this patent is extended or adjusted under 35 U.S.C. 154(b) by 423 days.

(21) Appl. No.: 13/127,549

(22) PCT Filed: Nov. 4, 2009

(86) PCT No.: PCT/EP2009/064647
§ 371 (c)(1),
(2), (4) Date: May 18, 2011

(87) PCT Pub. No.: WO2010/052254
PCT Pub. Date: Mar. 14, 2010

(65) Prior Publication Data
US 2011/0260722 A1 Oct. 27, 2011

(30) Foreign Application Priority Data
Nov. 4, 2008 (FR) .................................... 08 06139

(51) Int. Cl.
*B64G 1/64* (2006.01)
(52) U.S. Cl.
USPC ..................................... 244/172.4; 244/158.4
(58) Field of Classification Search
None
See application file for complete search history.

(56) References Cited

U.S. PATENT DOCUMENTS

| | | | |
|---|---|---|---|
| 3,201,065 A | 8/1965 | Dunn | |
| 5,397,082 A * | 3/1995 | Scott | 244/158.4 |
| 6,089,510 A | 7/2000 | Villani et al. | |
| 7,464,902 B2 * | 12/2008 | Leyre et al. | 244/173.3 |
| 8,052,092 B2 * | 11/2011 | Atmur et al. | 244/158.2 |
| 8,205,838 B2 * | 6/2012 | Moorer et al. | 244/158.6 |
| 8,210,480 B2 * | 7/2012 | Moorer et al. | 244/158.6 |
| 8,226,046 B2 * | 7/2012 | Poulos | 244/172.4 |
| 2003/0098394 A1 | 5/2003 | Cooper | |
| 2006/0091262 A1 * | 5/2006 | Belisle | 244/166 |

FOREIGN PATENT DOCUMENTS

FR 2686858 A 8/1993

OTHER PUBLICATIONS

Catharine A. Conley, Planetary Protection for Mars Sample Return, ESA/NASA, Apr. 29, 2013.*
S. Clerc, Control of a Magnetic Capture Device for Autonomous In-orbit Rendezvous, 18th IFAC World Congress, Milano, Italy, Aug. 28, 2011.*
Mattingly, R,. et al.: "Technology Development Plans for the Mars Sample Return Mission," Aerospace Conference, 2005 IEEE, Piscataway, NJ, USA, Mar. 5, 2005, pp. 1-14, XP010864344.

* cited by examiner

*Primary Examiner* — Benjamin P Lee
(74) *Attorney, Agent, or Firm* — Baker & Hostetler LLP

(57) ABSTRACT

A method for capturing a container of planet ground samples moving in space by a probe also moving in space includes, when the probe is on the orbit of the container, at a distance of a few meters therefrom and the receiving face of the probe is oriented toward the container, generating, on board the probe, a first controlled magnetic field to reduce the angular speeds of the container and orient it in a preferred direction for the capture, and, when these speeds have become negligible and the probe is positioned in the correct orientation, while the probe is being brought closer to the container, a process of attraction of the container relative to the probe is begun using another field whose field lines converge toward the capture zone of the probe.

8 Claims, 1 Drawing Sheet

METHOD FOR CAPTURING A CONTAINER OF PLANET-GROUND SAMPLES TRAVELING IN OPEN SPACE

CROSS-REFERENCE TO RELATED APPLICATIONS

This application is a National Stage of International patent application PCT/EP2009/064647, filed on Nov. 4, 2009, which claims priority to foreign French patent application No. FR 08 06139, filed on Nov. 4, 2008, the disclosures of which are incorporated by reference in their entirety.

FIELD OF THE INVENTION

The present invention relates to a method for capturing a container of planet ground samples moving in space by a probe also moving in space.

BACKGROUND OF THE INVENTION

The various space missions currently planned, such as those of NASA and ESA, envisage taking planet ground samples and returning them to Earth. Some of these missions are already scheduled, such as, for example, the European "Mars Sample Return" program (collection of samples from Mars) planned around 2010.

Numerous studies have been conducted on this subject, and the space agencies have established scenarios according to which samples taken from the ground of planets and packaged in a container for their transportation to Earth were placed in orbit by a launcher from the planet concerned, a probe also placed on this orbit from the Earth being charged with recovering this container to return it to Earth. Such a separation of roles between a launcher placing the container in orbit and a probe charged with capturing it and transporting it to Earth is dictated by the effectiveness of the transfer of masses in orbit (according to the well known laws of orbital mechanics). The result is that the crucial phase of capture in orbit of the samples in their container cannot be avoided. Now, hitherto, no simple system for capturing planet ground samples in orbit has been proposed.

All the known systems are based on the assumption that the sample container is either very heavy and complex (it would then have to include remote control means, thrusters, etc.), or of the passive type. The mechanisms for capturing the probe are therefore very bulky, with unfoldable structures, which requires the probe to perform complex movements. Furthermore, it is generally impossible to simulate on Earth the corresponding process sequences and validate them, because these sequences include long movement procedures performed under zero gravity and involving devices of very large dimensions. The case of a heavy and complex container has been generally eliminated, because no known mission for the next ten years has retained it.

SUMMARY OF THE INVENTION

An embodiment of the present invention includes a method for capturing a container of planet ground samples moving in space by a probe also moving in space, this method having to be easy to implement, with the simplest and most inexpensive means possible.

The method according to the invention is characterized in that when the probe is on the orbit of the container, at a distance of a few meters therefrom and the receiving face of the probe is oriented toward the container, a first controlled magnetic field to reduce the angular speeds of the container and orient it in a preferred direction for the capture, is generated on board the probe, and, when these speeds have become negligible and said probe is positioned in the correct orientation, while the probe is being brought closer to the container, a process of attraction of the container relative to the probe is begun using another magnetic field whose field lines converge toward the capture zone of the probe.

According to another characteristic of the invention, the magnetic field on the container side, used for the control and for the attraction, is used to enable the probe to detect its attitude using a magnetometer.

BRIEF DESCRIPTION OF THE DRAWINGS

The present invention will be better understood from reading the detailed description of an embodiment, taken as a nonlimiting example and illustrated by the appended drawing, in which.

DETAILED DESCRIPTION

Figure 1:
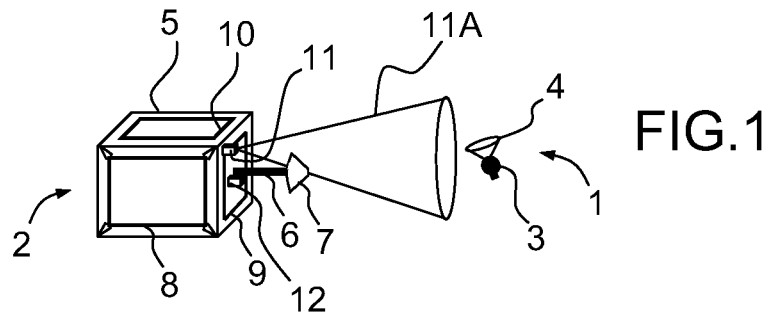
FIG. 1 is a simplified block diagram of a system implementing the method of the invention.

FIG. 1 diagrammatically shows the main means for implementing the method of the invention. These means have been represented at the moment when the container 1, having previously recovered ground samples from a planet (for example the planet Mars), has been placed in orbit around this planet and is close (at a few tens of meters for example) to a recovery probe 2 which has previously been launched from the Earth and placed on the same orbit as this container 1. The probe 2 may be any appropriate spacecraft (satellite, specific craft placed in orbit, etc.) capable of accommodating the container 1.

The container 1, purely passive, mainly comprises a body 3 notably enclosing the samples taken, a device that can be used to automatically determine its attitude at a distance (not represented), and, where appropriate, RF communication means and an electrical energy source. According to an advantageous embodiment of the invention, this attitude determination device is a magnet, preferably a permanent magnet. Such a permanent magnet can be used both to determine the attitude with the magnetometer but also for control because of its interaction with the magnetic field generated by the probe. On one of the faces of the body 3 there is fixed a device 4 for assisting in the docking of the probe, which is a cone in the present case. Generally, this device 4 may be any system of a shape that is paired between probe and container, however, for simplicity, hereinafter in the description, the term "cone" will be used to designate this device 4. When this container is in orbit, it revolves on itself (movement called "spin") and has erratic movements.

The probe 2 mainly comprises a body 5 to which is fixed a mast 6 at the free end of which is fixed a cone 7 whose shape complements that of the cone 4, that is to say that these two cones have the same angle at the apex. The body 5, having, for example, substantially a rectangular parallelepipedal shape, comprises, on three of its faces respectively perpendicular to one another, flat coils 8, 9 and 10 each delimiting a surface area that is as large as possible, typically a surface area of 1 m*1 m or 1 m*2 m, depending on the dimensions of the probe. As a variant, more compact coils are used on a bar of good magnetic permeability, delivering an equivalent magnetic moment. These coils produce a controlled magnetic field whose nominal value is, for example, approximately 50 to 100 A·m². A transmission/reception telescope 11 of a Lidar (or a similar detection device, for example a camera or an HF sensor if the container includes an HF transmitter) and a magnetometer 12 are fixed on the same face of the body 5 as the cone 7, that is to say, its face which should be oriented toward the container 1, that we will call here front face. The optical axis of the telescope 11 is oriented parallel to the mast 6 and its cone of "visibility" is referenced 11A. The magnetometer 12 is of the type that can perform attitude measurements in space, according to three mutually perpendicular axes.

The body 5 also contains an ancillary thruster, for example of chemical type (not represented) making it possible to modify the attitude and the position of the probe 2 according to six degrees of freedom (three degrees in rotation and three degrees in translation) in order to correctly orient its front face toward the container 1.

Figure 2:
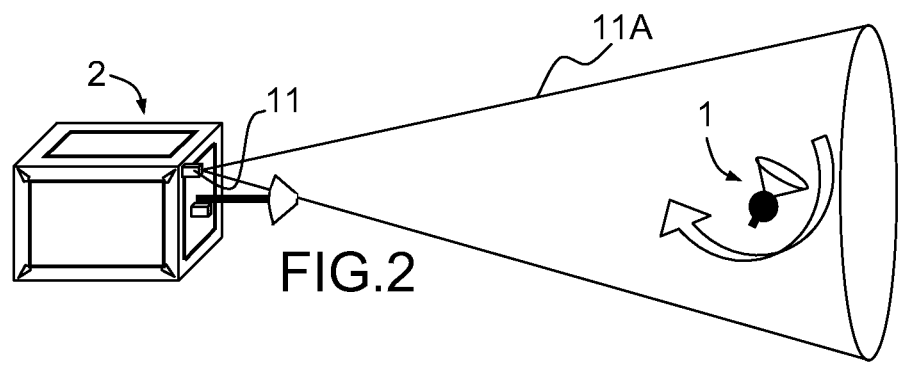
FIGS. 2 to 4 are block diagrams showing a number of steps in implementing the method according to the present invention using the system of FIG. 1.

Whereas FIG. 1 diagrammatically represents the container 1 and the probe 2 at an instant when they are a little too far apart from one another for the magnetometer 12 to be able to detect it easily, FIG. 2 diagrammatically represents their respective positions when the container is at a distance of a few meters from the probe (for example 3 to 5 meters). At such a distance, the container is within the "cone of vision" 11A of the telescope 11 of the Lidar, and the magnetometer can begin to effectively pick up the field created by the permanent magnet of the container 1, which is, for example, approximately 40 A·m². In this situation, as soon as the Lidar has detected the presence of the container 1, the magnetometer 12 is activated and determines the parameters of the spin rotation of the container, or more precisely, the spin rotation of the permanent magnet which is housed within this container. The coils 8 to 10 are then activated according to a determined sequence for controlling the current of these coils (which is a function of the measured spin value) in order to attenuate the value of this spin. The relative probe-container position is measured by the Lidar or by a camera and corrected by thrusters (not represented) mounted on board the probe. The inertia matrix of the container is oriented so as to align its magnetic moment with an intermediate inertia axis and with the axis of symmetry of the capture device of the container, which makes it possible to attenuate movements on three axes with a resisting torque with two axes.

Figure 3:
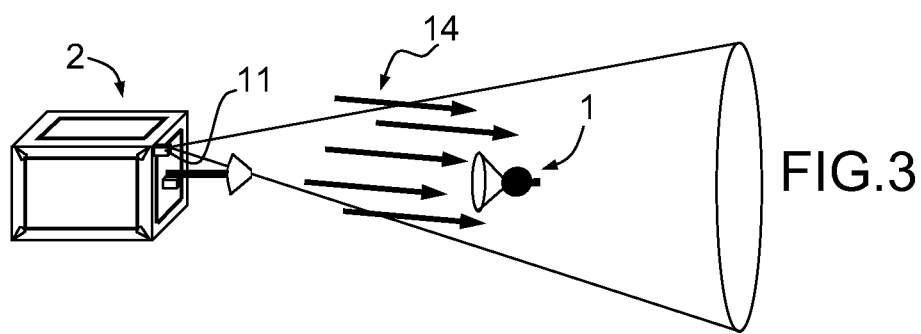

As soon as the spin rotation speed of the container has been sufficiently attenuated (typically <1 degree/second), there are applied to the coils 8 to 10, simultaneously, a fixed bias current of controlling magnetic moment and a modulated moment, as in the initial phase for damping the angular speeds. By virtue of this attenuation, the magnetic moment of the magnet of the container is aligned with the polarization field 14 (in the manner of a compass needle which is aligned on the Earth's magnetic field, see FIG. 3). The axis of the cone 4 is then practically the same as the axis of the cone 7. The position control of the container is performed using conventional means (chemical thrusting of the probe) with low approach speed.

Figure 4:
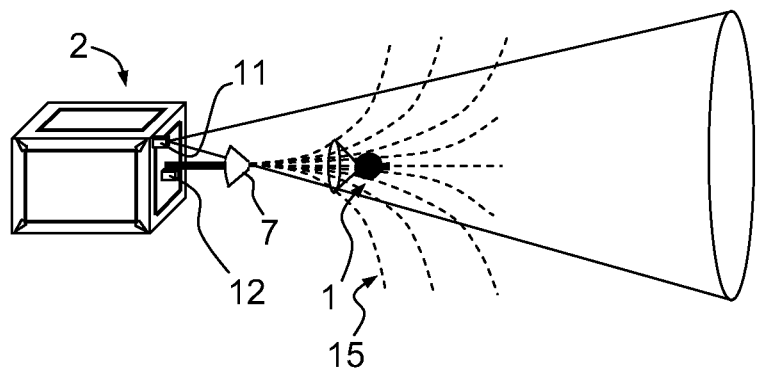

When the container arrives at a short distance from the probe (for example approximately 20 cm to 1 meter, see FIG. 4), a specific coil (not represented) is controlled to begin a process of attraction of the container relative to the probe using another field whose field lines 15 converge toward the capture zone of the probe. The cone 4 of the container then covers the cone 7 of the probe. The increase in the magnetic attraction force as the distance between the container and the probe reduces is advantageously controlled by slaving the current of said specific coil so that it prevents any bounce of the container on the probe.

As soon as the cone 4 of the container is in contact with the cone 7, means, for example mechanical means (not represented), are activated so as to transfer the container to the interior of the probe.

The invention claimed is:

1. A method for capturing a container of planet ground samples moving in space by a probe also moving in space, said method comprising, when the probe is on the orbit of the container, at a distance of a few meters from the container, and the receiving face of the probe is oriented toward the container;
   generating, on board the probe, a first controlled magnetic field to reduce the angular speeds of the container and orient the container in a preferred direction for the capture; and
   when the speeds have become negligible and said probe is positioned in the correct orientation, while the probe is being brought closer to the container, beginning a process of attraction of the container relative to the probe using another field whose field lines converge toward the capture zone of the probe.

2. The method as claimed in claim 1, wherein the magnetic field on the container side, used for the control and for the attraction, is used to enable the probe to detect its attitude using a magnetometer.

3. The method as claimed in claim 1, wherein the first field has a nominal value of approximately 50 A·m² to approximately 100 A·m².

4. The method as claimed in claim 1, wherein the probe detects the proximity of the container using at least one of the following sensors: a Lidar, a camera, and an HF sensor.

5. The method as claimed in claim 1, wherein the probe includes an ancillary thruster to modify the probe attitude according to six degrees of freedom.

6. The method as claimed in claim 1, wherein the process of attraction of the container is begun when the distance between the container and the probe is from approximately 20 cm to approximately 1 meter.

7. The method as claimed in claim 6, wherein the process of attraction comprises a phase for slaving the current of the coils to prevent bounce of the container on the probe.

8. The method as claimed in claim 1, wherein, when the container is in contact with the probe, means are activated to transfer the container to the interior of the probe.

* * * * *